(12) United States Patent
O'Kroley

(10) Patent No.: US 8,322,943 B2
(45) Date of Patent: Dec. 4, 2012

(54) TRANSPORTATION SYSTEM FOR ZERO-EMISSIONS VEHICLES, RIDER PROPELLED VEHICLES, AND PEDESTRIANS

(76) Inventor: Colin Craig O'Kroley, Odessa, TX (US)

( * ) Notice: Subject to any disclaimer, the term of this patent is extended or adjusted under 35 U.S.C. 154(b) by 860 days.

(21) Appl. No.: 12/316,244

(22) Filed: Dec. 11, 2008

(65) Prior Publication Data

US 2010/0150649 A1   Jun. 17, 2010

(51) Int. Cl.
*E01D 1/00* (2006.01)
(52) U.S. Cl. ............... 404/1; 14/78; 52/175; 52/176
(58) Field of Classification Search .......... 52/169.2, 52/169.4, 174, 175, 176; 404/1; 14/78
See application file for complete search history.

(56) References Cited

U.S. PATENT DOCUMENTS

| | | | | |
|---|---|---|---|---|
| 671,686 A | * | 4/1901 | Bergeron | 405/132 |
| 1,303,978 A | * | 5/1919 | Smith | 414/249 |
| 1,629,787 A | * | 5/1927 | Hackett | 52/175 |
| 2,695,716 A | * | 11/1954 | Graham | 414/229 |
| 2,698,974 A | * | 1/1955 | White | 52/175 |
| 2,717,428 A | * | 9/1955 | White | 52/175 |
| 3,438,162 A | * | 4/1969 | Graham | 52/175 |
| 3,831,526 A | * | 8/1974 | Howells et al. | 104/121 |
| 3,859,682 A | * | 1/1975 | Sulkiewicz | 14/3 |
| 4,945,594 A | * | 8/1990 | Tomb | 14/78 |
| 5,538,357 A | * | 7/1996 | Boswell, Sr. | 404/1 |
| 5,829,941 A | * | 11/1998 | Morfin | 414/261 |
| 7,866,910 B2 | * | 1/2011 | Gustafson et al. | 404/1 |

FOREIGN PATENT DOCUMENTS

| | | | |
|---|---|---|---|
| DE | 31 47 486 | * | 7/1983 |
| EP | 0 384 902 | * | 8/1990 |
| JP | 6-316902 | * | 11/1994 |

* cited by examiner

*Primary Examiner* — Gary S Hartmann

(57) ABSTRACT

A transportation system for rider propelled vehicles, zero-emission vehicles, and pedestrians is disclosed. The system includes pathways (517, 317, 717, 519, 119, 319, 719, 919, 523, 123, 323, 723, 923, 525, 325, 725) that are integrated into a building structure (101) or a series of building structures (100, 300, 500, 700, 900) connected by bridges (34, 35, 36, 37, 30, 31, 32, 33) which have an overall downward sloping grade. Elevators (515, 520, 522, 527, 115, 120, 122, 127, 315, 320, 322, 327, 715, 720, 722, 727, 915, 920, 922, 927) are utilized to transport riders, vehicles, and pedestrians to the integrated pathway.

16 Claims, 14 Drawing Sheets

TRANSPORTATION SYSTEM FOR ZERO-EMISSIONS VEHICLES, RIDER PROPELLED VEHICLES, AND PEDESTRIANS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

This invention relates to transportation modes, and, more particularly, relates to transportation systems for zero-emission vehicles, rider propelled vehicles, and pedestrians.

2. Prior Art

The movement by various agencies to plan and provide for transportation systems which encourage and accommodate multiple modes of urban travel (multi-modal transportation system planning), including private motor vehicular, self-propelled (such as bicycles), pedestrian, and mass transit modes and corridors, has gained momentum in recent years. One key element of such planning is the provision of multi-nodal systems, that is, transportation systems that provide links between the various modes of movement in the system (for example, the provision of central mass transit stations linked to both major thoroughfares and at the hubs of an urban bus system).

Left out of much of this planning, however, has been consideration for linking the so called "bike-way" element of such plans into the multi-nodal system in such a way as to encourage the use of rider propelled (non-motorized) transportation as a primary mode of transportation in the system, rather than as a mere means of entertainment or recreation. In particular, such bike-ways are typically not provided in sufficient number, with sufficient separation from vehicular facilities or with sufficient links to other modes to make their use practical for commuting, as means for access to shopping facilities and the like. This has been due, in part, to the expense and/or difficulty of acquiring ways of access (easements) for bike-way construction, particularly in more congested and/or long developed urban areas, and to the costs of construction and maintenance.

Moreover, little consideration has been given to providing bike-way systems which lessen the physical impacts inherent in use of such a system, including weather related impacts and the physical exertion necessary to move over longer distances, such systems being exposed to the elements and typically following whatever terrain happens to be available for the facility.

It is apparent that for such non-motorized modes of transportation to become primary in use, improvement of the bike-way element of multi-modal transportation systems is necessary. However, for such improvements to be adopted, the costs associated with an improved bike-way element must be reasonably related to the projected benefits, preferably adding little if any expense to current per mile aggregate acquisition, construction and maintenance costs.

Also, the bike-way element is often restricted to bicycles only. Alternative transportation modes such as walking, electric tricycles, electric bicycles, skateboards, scooters, quad-cycles, and electric scooters are rarely incorporated in transportation system designs.

By designing a community for pedestrians, self-propelled vehicles, bicycles, lightweight electric vehicles and other zero-emission vehicles, many other broader benefits will be achieved as well. First of all, the U.S. need for foreign oil will be reduced because we will be moving from the use of the heavy, gasoline powered automobile for transportation to human powered bicycles or lightweight, electrically propelled vehicles. If lightweight electric vehicles are used in this invention, they will be designed far lighter than automobiles, so they will help conserve energy. Furthermore, since parts of this invention are elevated, cross traffic can be managed more effectively by using different elevations to accommodate it; Therefore fewer traffic controls than conventional transportation systems are necessary so energy will be conserved by reducing the need for braking. Reducing the U.S. dependency on foreign oil has been recommended by a recent presidential commission on energy. Secondly, this same change in the emphasis of the primary means of transportation will reduce green house gas emissions as well. Reduction of green house gases has been recommended by Nobel Prize winner Al Gore and California Governor Arnold Schwarzenegger among many others because it will reduce the threat of global warming. Thirdly, traffic congestion will be reduced in metropolitan areas where this invention is utilized. Traffic congestion has been a serious problem that the L.A. Times has reported citizens are willing to pay to reduce. Fourthly, this invention will provide alternate means of escape from terrorists attacks on buildings. Also, this invention will help incorporate exercise into the everyday lifestyle of Americans. Daily exercise has been recommended recently by the U.S. Department of Health and Human Services to help combat rising levels of obesity, heart disease, and cancer. Finally, this invention will stimulate growth in industries such as bicycle, tricycle, quad-cycle, skateboard, scooter, lightweight electric vehicle, lightweight hydrogen vehicle, in-line skate and traditional skate manufacturing while eroding the market share of traditional petroleum powered, greenhouse gas producing, air polluting, inefficient, internal-combustion engine based vehicles.

A transportation system and method proposed previously (U.S. Pat. No. 5,671,681 Senior, III; Milnor H. Filed Aug. 30, 1996) uses an air circulation system to assist and promote non-motorized transportation methods. However, this forced air system has never been reduced to practice and cannot be constructed in a cost effective manner where it would be most useful—on inclines. In fact, it would be impossible for a rider to enter the pathway and proceed up an incline because the entrances to the pathway have no lifts, elevators or escalators. (The pathway is designed to be built independent of and above the terrain at a selected grade of "lack of grade". (Claim number 10. "The method of claim 9 wherein said selected grade characteristics are lack of grade along most of said distance.")) Also, the forced air system mentioned above excludes pedestrian traffic.

OBJECTS AND ADVANTAGES

Never before has a pathway, road, sidewalk, or bike-way been deliberately constructed in a downward, sloping manner through buildings (and over bridges) to aid vehicular transportation through the use of the force of gravity. Several objects and advantages of this invention are:

(a) to allow a self-propelled, zero-emission or electrically propelled traveler to always propel themselves on a downhill grade on a round trip;
(b) to allow a self-propelled, zero emission or electrically propelled traveler to always propel themselves without a headwind if this invention is completely enclosed;
(c) to ensure that a self-propelled, zero emmision or electrically propelled traveler will not have to deal with the obstacle of in-climate weather if this invention is completely enclosed;
(d) to provide a safe downward grade when the natural grade of the terrain has a downward grade that is dangerously or excessively steep;
(e) to reduce the need for braking for traffic controls since the pathway is elevated and built independent of the terrain;
(f) to provide an improved transportation method for rider propelled vehicles, zero-emission vehicles, electrically propelled vehicles and pedestrians;
(g) to provide an improved pedestrian, zero emission vehicle, and rider propelled vehicle transportation system that requires less easement area to install, is adapted for use in congested urban areas, enables siting independently from streets and highways, protects users from adverse weather conditions, and lessens the physical exertion or energy necessary for movement of a rider propelled vehicle, zero-emission vehicle, or pedestrian;
(h) to provide improved pedestrian, zero emission vehicle, and rider propelled vehicle transportation systems that assist travelers by providing an overall downward grade along a pathway to assist vehicle movement there-along without replacing traveler directional and speed control and primary propulsion of the traveler or vehicle;
(i) to provide a transportation system for pedestrians, zero-emission vehicles, and rider propelled vehicles which includes the step of covering a pathway throughout substantially the full extent of the distance between point of departure and destination;
(j) to provide a pedestrian, zero emission vehicle or rider propelled vehicle transportation system which includes the step of elevating at least one pathway for the purpose of controlling grade thereof independent of the grade of the surrounding terrain;
(k) to provide a system for assisting movement of a rider propelled vehicle, zero-emission vehicle, electrically propelled vehicle, and pedestrian including the steps of dedicating a pathway connecting first and second selected locations to primarily provide for movement there-along of the rider propelled vehicles, zero-emission vehicles, electrically propelled vehicles, and pedestrians and assisting riders moving along the pathway in propelling the vehicles without replacing rider directional and speed control and primary rider propulsion of the vehicles by providing an overall downward grade along the pathway in the direction of travel and providing a means for elevating the vehicles, riders, and pedestrians to the pathway;
(l) to provide a system for improving a rider propelled transportation component in a transportation system including the steps of establishing a pathway for rider propelled transportation that extends a distance from a point of departure to a destination and is segregated from pedestrian and traditional (internal combustion engine) automobile vehicular transportation pathway components of the system, and covering the pathway along the entire distance to shield the pathway and travelers thereon from precipitation;
(m) to provide a system for establishing environments assisting pedestrians, riders in propulsion of rider propelled vehicles, zero-emission and electrically propelled vehicles that includes the steps of providing a covered pathway having characteristics selected to accommodate walking or normal rider operational control of a vehicle when traveling through the covered pathway, providing an overall downward grade along the pathway to establish a substantially constant gravitational force on pedestrians or vehicles travelling through the covered pathway to thereby assist propulsion of a pedestrian or vehicle in the direction of movement without replacing normal rider operational control and propulsion of the vehicles; and, controlling entry to and exit from said covered pathway by providing a means to elevate travelers to the pathway;
(n) to provide a method for establishing environments assisting, pedestrians, zero-emission vehicles, and riders in propulsion of rider propelled vehicles that includes the steps of defining first and second pathways at a given location, and providing a downward grade in each of the pathways to establish a substantially constant gravitational force in opposite directions in the first and second pathways to assist travelers in propelling themselves and/or their vehicles in each of the pathways in the respective flow directions if no natural downward grade is utilized in either direction;
(o) to provide an improved transportation method by providing an interchange when two downward sloping pathways intersect at approximately the same elevation in a structure.

With these and other objects in view, which will become apparent to one skilled in the art as the description proceeds, this invention resides in the novel system, construction, combination, arrangement of parts and method substantially as hereinafter described, and more particularly defined by the appended claims, it being understood that changes in the precise embodiment of the herein disclosed invention are meant to be included as come within the scope of the claims. Still further objects and advantages will become apparent from a consideration of the ensuing description and drawings. For instance, one could envision all of the self-propelled vehicles being enclosed thereby eliminating the need to enclose the entire pathway which would then open the possibility of allowing lightweight internal combustion engine propelled vehicles in the system.

SUMMARY OF THE INVENTION

This invention is a master-planned community using buildings with integrated roads (graded (downhill) or level) and possibly bridges (graded (downhill) or level) which overall have a (downhill) grade to facilitate transportation through the use of the force of gravity. Bridges (graded (downhill) or level) can be used to facilitate cross traffic and to connect buildings incorporated in this invention. Elevators assist pedestrians, zero-emission vehicles, lightweight electrically propelled vehicles, drivers, passengers, and cargo of vehicles up or down through a building to integrated roads or parking areas. To clarify, neither a section of road through a particular building nor a bridge (if used) between buildings has to be built with a downhill grade or slope, but overall the entire system of integrated roads within the building(s) and possibly bridges has to be built with an overall downhill grade or slope to facilitate transportation. If built on a moderate natural slope, only one man-made slope (in the opposite direction of the natural slope) that is integrated into the buildings and/or bridges may be necessary. If no natural slope is present the construction of a bi-directional system to facilitate transportation in both directions with the force of gravity is necessary. That is, one of the integrated roads in the system will slope down in one direction and the other integrated road will slope down in the opposite direction so gravity will assist a vehicle in either direction. The ideal grade of all the roads in this invention is around 4% in both directions for normal, "city" walking/riding/driving that is downhill in both directions. This bi-directional type system can also provide a better grade for a bicyclist or other human powered traveler, when the natural slope is too steep; However, a grade of greater than 4% might be considered to "launch" a vehicle over a greater distance at a higher speed—particularly if no retail, residential, commercial or other activity occurs in the area being traversed. Also, a grade of less than 4% may be appropriate just prior to entering a parking area for instance.

The buildings at the end of this system should be designed with expansion needs in mind so it would be easy to add a bridge to another building that is constructed past the confines of the existing system. Semi-permanent walls can be placed at the ends of the pathways until future expansion makes it necessary to connect another selected location to the system. Also, hubs can be created to connect systems that are oriented to one another in a non-parallel manner. Having mentioned the bridges and multiple buildings above, I do not wish to be tied to the point of multiple buildings and bridges because the issue of "sway" may force the construction of the system to be entirely under one roof or in one building. Sway is created when wind strikes high rise buildings and causes them to move. Sway can also be created during an earthquake.

This invention provides an improved transportation system for rider propelled vehicles (such as bicycles), zero-emission vehicles (such as lightweight electrically propelled vehicles), and pedestrians. This system being especially well adapted for urban use and for urban transportation systems, though use can as well be made of the herein disclosed system for non-urban travel.

The bicycle, zero-emission vehicle and pedestrian transportation methods of this invention are adapted for use in congested urban areas, can be utilized independently from streets and highways, protect users from adverse weather conditions, and lessen the physical exertion necessary for movement. It is projected, that with increased use of systems employing this invention, the overall cost of the system, relative to acquisition, installation, and maintenance costs of existing types of bike-way systems and other transportation modes in an urban transportation system, will have a beneficial impact on the overall transportation budget in an urban area where it is utilized.

The methods for assisting movement of a rider propelled non-motorized vehicle (such as a bicycle) or a zero-emission vehicle (such as a lightweight electrically propelled vehicle) of this invention include the steps of dedicating a pathway connecting first and second selected locations to primarily provide for movement there-along of the rider propelled non-motorized vehicles or zero-emission vehicles and assisting riders moving along the pathway in propelling the vehicles without replacing rider directional and speed control and primary rider propulsion of the vehicles by providing an overall downward grade along the pathway in a direction of travel and by providing a means for elevating travelers to the pathway. Similarly, the methods for assisting movement of a pedestrian of this invention include the steps of dedicating a pathway connecting first and second selected locations to primarily provide for movement there-along of the pedestrian and assisting pedestrian moving along the pathway in walking without replacing pedestrian directional and speed control and primary pedestrian propulsion by providing an overall downward grade along the pathway in a direction of travel and by providing a means for elevating pedestrians to the pathway.

The pathway is preferably covered along its entire distance to shield the pathway and cyclists, skateboarders, scooter users, and pedestrians, etc. thereon from precipitation, and is preferably segregated from other components of the transportation network. Pedestrians, vehicles and their riders are transported to the pathway using a means for elevating travelers, such as elevators, to the integrated pathway or road. The pathway or road is constructed with an overall downward grade that assists the pedestrians and riders to their destinations. Interchanges can be utilized to shorten the length of trips when the two pathways intersect in a building at approximately the same elevation or when two non-parallel systems intersect. Downward grades can be created in both directions if no natural grade is present to assist riders and their vehicles. Gravity will thereby assist propulsion of a rider propelled, zero-emission vehicle, or lightweight electrically propelled vehicle in the direction of the pathway without replacing normal rider operational control and propulsion of the vehicle. Gravity will also assist a pedestrian down the pathway.

First and second pathways are preferably defined at the selected locations. Gravity assists vehicles, riders and pedestrians in each of the passageways establishing a substantially constant force in opposite flow directions in the first and second passageways to assist pedestrians walking and in propulsion of vehicles in each of the passageways in the respective flow directions.

At least one of the covered pathways is elevated to provide selected pathway grade characteristics independent of the terrain grade at the site of installation.

BRIEF DESCRIPTION OF THE DRAWINGS

FIG. 18 is referred to in FIG. 17.

DESCRIPTION OF THE PREFERRED EMBODIMENT OF THE INVENTION

Figure 1:
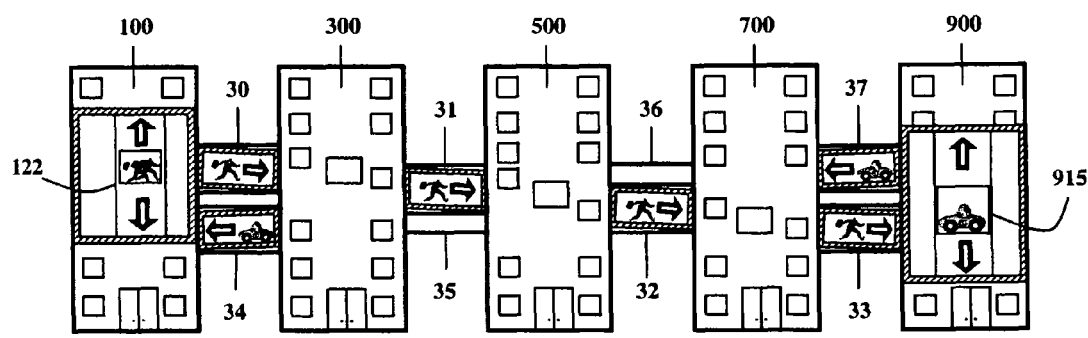
FIG. 1 shows a side view of a bi-directional version of this invention on a flat terrain (terrain not shown) with downhill roads in both directions integrated into buildings (100, 300, 500, 700, & 900) and bridges (30, 31, 32, 33, 34, 35, 36, & 37). (The view from the opposite side would be so similar that it is not shown.) Several cross-sections are now shown (at different depths) to more clearly point out the invention and the relationships of the parts comprising the invention. Windows, doors and stairs have been added to help illustrate the invention and correct the simple box and line sketch criticism. Also, to this afore-mentioned effect, the bridges have been angled.
Figure 2:
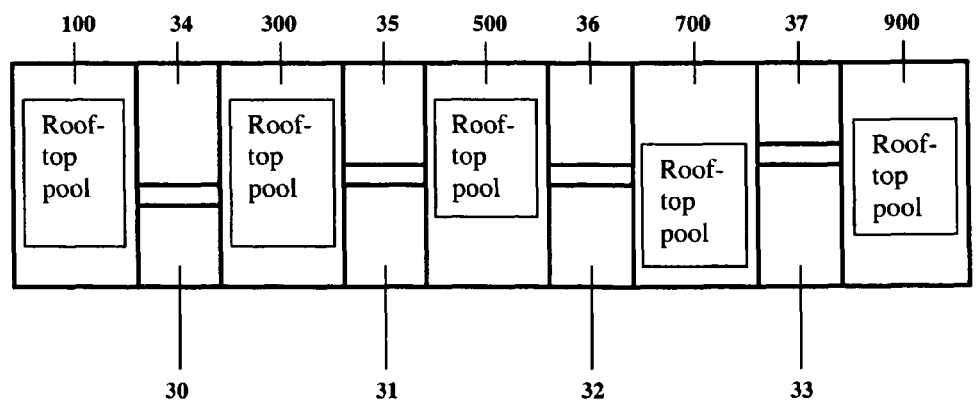
FIG. 2 shows a top view of the invention in FIG. 1 with the integrated roads (not shown) and bridges becoming wider at lower elevations to accommodate traffic. (Traffic not shown) (The view from the bottom would be so similar that it is not shown.) Rectangles delineating the positions of roof-top pools are now shown to help orient the viewer and correct the simple box and line sketch criticism.
Figure 3:
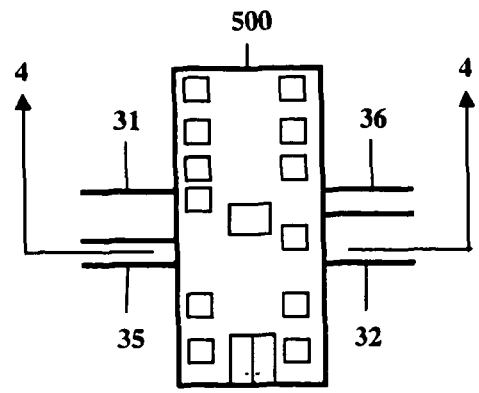
FIG. 3 is a side view of building 500 with reference arrows for FIG. 4 which is a cross-sectional top view of building 500 as it appears in embodiment #1. (The depictions of the other buildings would not have a significant amount of new information so they're not shown.) Windows, doors and stairs have been added to help illustrate the invention and correct the simple box and line sketch criticism. Also, to this aforementioned effect, the bridges have been angled.

Referring to FIG. 1, a first embodiment of the invention would look like FIG. 1. FIG. 1 incorporates bridges in the invention to help demonstrate what the invention is. A first embodiment the invention like the one shown in FIG. 1 would have a tall building 100 (100) with an upper level bridge on it 30 (30) that connects to building 300 (300). Building 300 (300) would have downhill vehicle and pedestrian roads (not shown) traversing it from bridge 30 (30) to bridge 31 (31) which is on the opposite side of bridge 30 (30) and at a slightly lower elevation. Bridge 31 (31) also connects to building 500 (500). Building 500 (500) is connected to bridges 32 (32), 35 (35), and 36 (36) as well as bridge 31 (31). Building 700 (700) is connected to bridges 36 (36) and 37 (37) at the upper level and bridges 32 (32) and 33 (33) at the lower level. Building 900 (900) is connected to bridge 37 (37) at the upper levels and bridge 33 (33) at the lower level. Building 300 (300) is connected to bridges 34 (34) and 35 (35) on the lower levels and building 100 (100) is connected to bridge 34 (34) at the lower level. The buildings 300 (300), 500 (500), & 700 (700) each have roads traversing through them that connect the nearest bridges at the upper and lower levels of the buildings. Building 100(100) and building 900 (900) are also connected to the bridges on the upper and lower levels, but only on one side of the building. The road (not shown) that traverses from building 900 (900) through buildings 700 (700), 500 (500), and 300 (300), to building 100 (100) via bridges 37 (37), 36 (36), 35 (35), and 34 (34) is to be built on an overall downhill grade. Similarly, the road (not shown) that traverses from building 100 (100) through buildings 300 (300), 500 (500), and 700 (700), to building 900 (900) via bridges 30 (30), 31 (31), 32 (32), and 33 (33) is to be built on an overall downhill grade. Although the bridges drawn in FIG. 1 are parallel to the terrain, (not shown) the roads (not shown) on those bridges would not necessarily have to be level with the terrain. It's recommended that the roads (not shown in FIG. 1 see FIG. 10 reference 3621) that are built on the bridges also have a downhill grade that will contribute to the overall downhill grades cited above.

Figure 4:
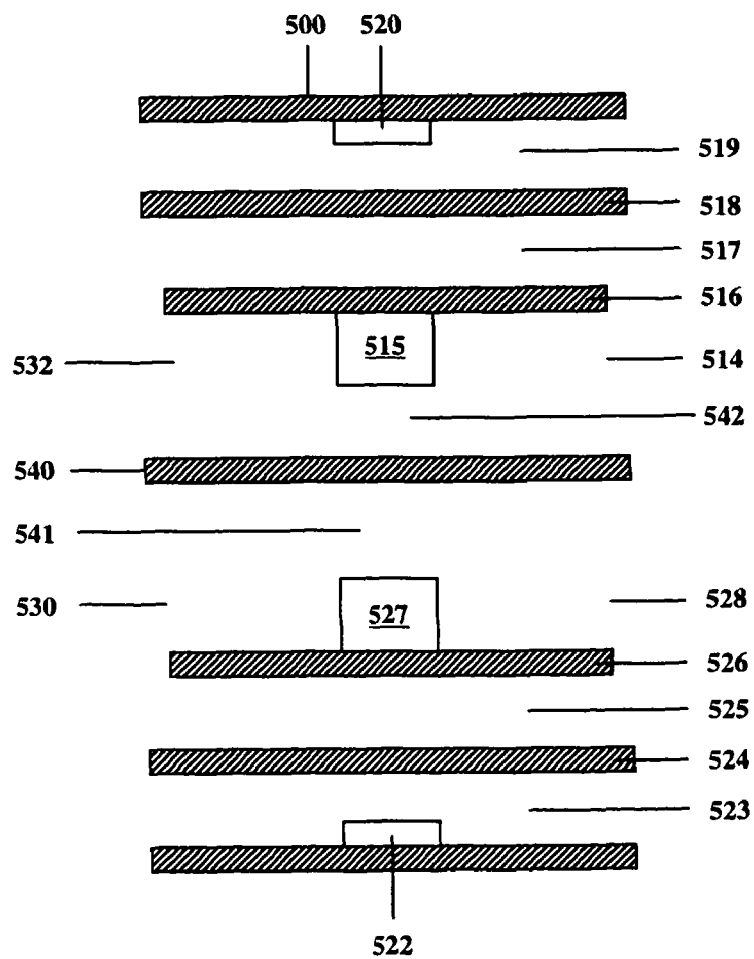
FIG. 4 is the top view cross-sectional diagram of building 500 referred to in FIG. 3. (The depictions of the other buildings would not have a significant amount of new information so they are not shown.)

Building 500 (500) has a divider (See FIG. 4, reference 526) which divides the vehicle road into a through traffic lane (See FIG. 4, reference 525) and a loading/unloading area (See FIG. 4, reference 542). The through traffic lane 525 (525) is built with a grade and it connects bridge 31 (31) directly through to bridge 32 (32) at a slightly lower elevation. The loading/unloading area 541 (541) is a level area where riders can park, load onto or off from elevator 527 (527), or travel through to bridge 32 (32). Since the loading/unloading area 541 (541) is level, ramps 528 (528) and 530 (530) are necessary to connect the level area 541 (541) to bridges 31 (31) and 32 (32) at slightly higher and lower elevations respectively.

Building 500 (500) has another divider (See FIG. 4, reference 516) which divides a vehicle road into a through traffic lane (See FIG. 4, reference 517) and a loading/unloading area (See FIG. 4, reference 542). The through traffic lane 517 (517) is built with a grade and it connects bridge 36 (36) directly through to bridge 35 (35) at a slightly lower elevation. The loading/unloading area 542 (542) is a level area where riders can park, load onto or off from elevator 515 (515), or travel through to bridge 35 (35). Since the loading/unloading area 542 (542) is level, ramps 514 (514) and 532 (532) are necessary to connect the level area 542 (542) to bridges 36 (36) and 35 (35) at slightly higher and lower elevations respectively.

Also, building 500 (500) connects the pedestrian lanes (See FIG. 4, references 523 & 519) that are outside of the vehicle lanes (See FIG. 4, references 525, 541, 542, and 517) from the bridges 31 (31) and 36 (36) at higher elevations to the bridges 32 (32) and 35 (35) at lower elevations on a gradient similar to the gradient used near the center of the building (See FIG. 4 references 528, 530, 514, & 532). Dividers 518 (518) and 524 (524) segregate the pedestrian lanes from the vehicle lanes. Elevators 520 (520) and 522 (522) transport pedestrians to and from the pathway.

Finally, another divider 540 (540) segregates the two traffic flows in building 500 that are in opposite directions.

Figure 5:
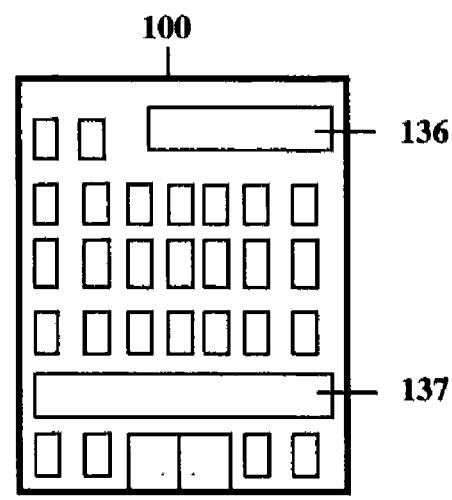
FIG. 5 shows an "end view" of the invention depicted in FIG. 1 which is simply the side of building 100 that is opposite of the side of building 100 where the bridges are connected to it. Windows and doors have been added to help illustrate the invention and the portion of the upper wall intended to allow for expansion has been rescaled. Both of these changes help to correct the simple box and line sketch criticism.
Figure 6:
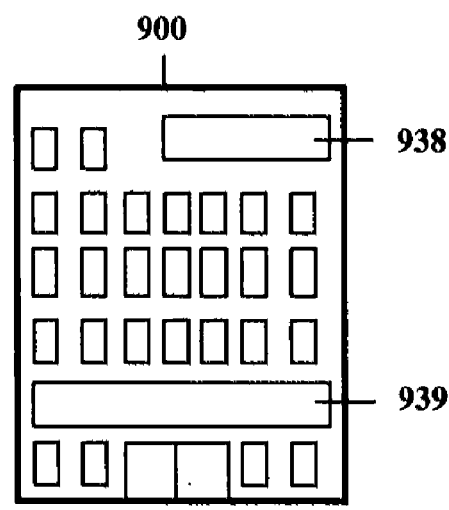
FIG. 6 shows the other "end view" of the invention depicted in FIG. 1 which is simply the side of building 900 that is on the opposite of the side of building 900 where the bridges are connected to it. Windows and doors have been added to help illustrate the invention and the portion of the upper wall intended to allow for expansion has been rescaled. Both of these changes help to correct the simple box and line sketch criticism.
Figure 7:
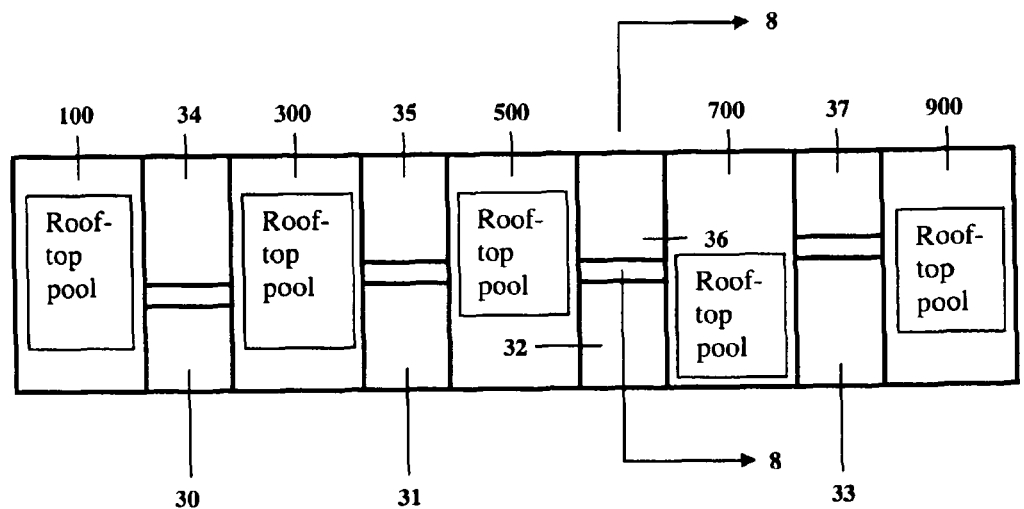
FIG. 7 is a top view of the invention depicted in FIG. 1 with reference arrows to show the orientation of the cross-sectional end-view of the preferred version of this invention at the midpoint of bridge 36 which is depicted in FIG. 8. (The other bridges would look so similar that they are not shown.) Rectangles delineating the positions of roof-top pools are now shown to help orient the viewer and correct the simple box and line sketch criticism.

Buildings 300 and 700 have pathways that look similar to the pathways in building 500; However, since the pathways in buildings 300 and 700 are at different elevations, a cross-sectional top view of one of these buildings at the point of one of it's pathways would look essentially like one half of the cross-sectional view of building 500 and traffic at that point would flow in only one direction. Similarly, cross-sectional top views of buildings 100 and 900 at the points of the pathways would look like those of buildings 300 and 700 but there would be no through traffic lanes because those buildings are at the endpoints of this embodiment of this invention. It's recommended, however, to design the system so that future expansion of it would be easy. It is recommended that building 100 (FIG. 5) has semi-permanent walls (FIG. 5—references 136 & 137) at the ends of the roads for the purpose of future expansion. Similarly, it is recommended that building 900 (FIG. 6) has semi-permanent walls (FIG. 6—references 938 & 939) at the ends of the roads for the purpose of future expansion.

Since the overall grade of the road or pathway through the buildings and bridges is downward, ramps are required at the junctions of the buildings and bridges if the loading and unloading areas around the elevators are constructed in a traditional level manner. Alternatively, it is possible to design the loading and unloading areas with a constant grade so long as the floor of the elevator has the same grade. The floors of the elevators 515 (515) and 527 (527) could have a grade built into them similar to the grade of the through traffic lanes 517 (517) and 525 (525) respectively then no ramps to and from the level areas would be necessary because the level areas could be eliminated. (FIG. 29 incorporates this idea in all lanes except for the pedestrian lanes.)

Figure 8:
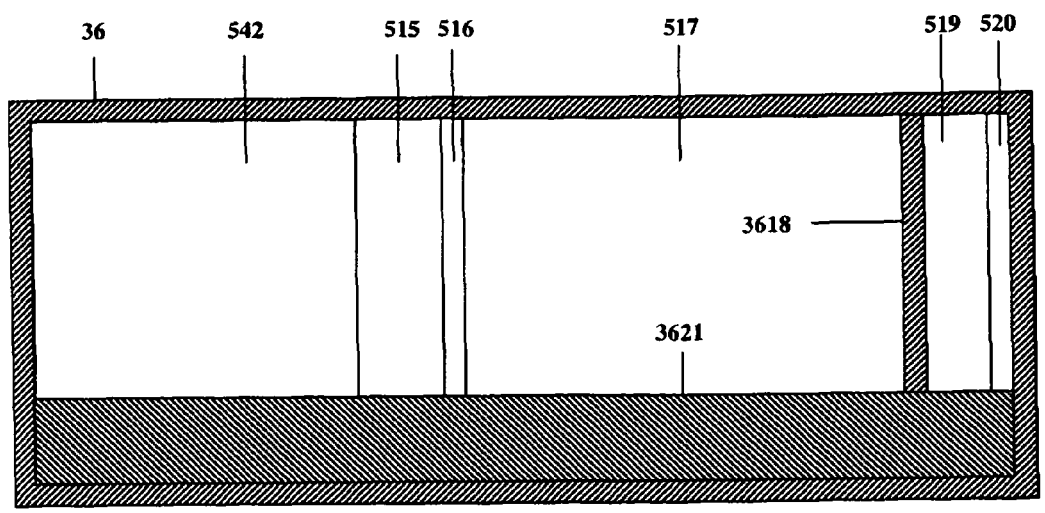
FIG. 8 shows the cross-sectional end-view of bridge 36 that is referred to in FIG. 7. (The other bridges would look so similar that they are not shown.)
Figure 9:
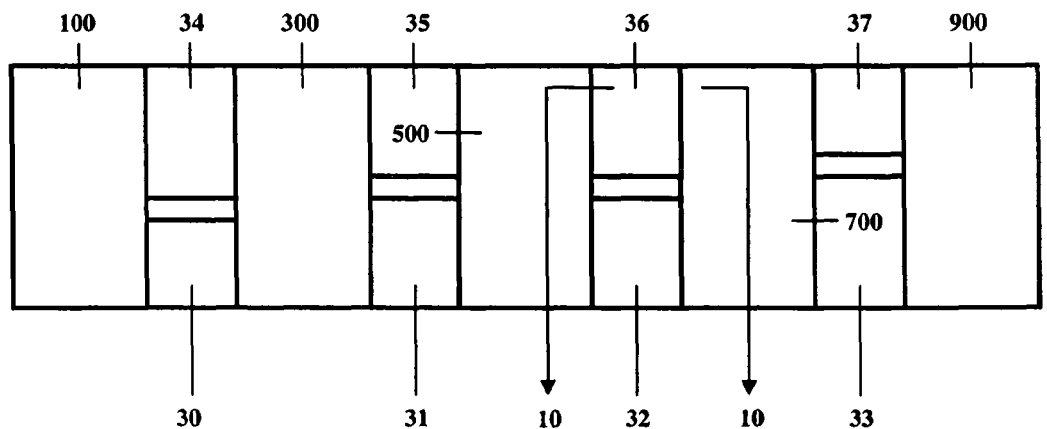
FIG. 9 is a top view of the invention depicted in FIG. 1 with reference arrows to show the orientation of the cross-sectional side-view of the preferred system road inside of bridge 36 which is depicted in FIG. 10. Rectangles delineating the positions of roof-top pools are now shown to help orient the viewer and correct the simple box and line sketch criticism.

FIG. 8 has many of the same features as FIG. 4 because it is essentially delineating the areas of the bridge 36 (36) that is connected to building 500 (500) which is portrayed in FIG. 4. The road at any point in the invention will look similar to FIG.

8 because the roads in the invention are, for the most part, uniform. Low traffic areas of the floors containing the roads in buildings 100 (100), 300 (300), 500 (500), 700 (700), & 900 (900) can be designated for parking. Various parking alternatives are put forth in other embodiments of this invention and will be discussed in the next section.

Figure 10:
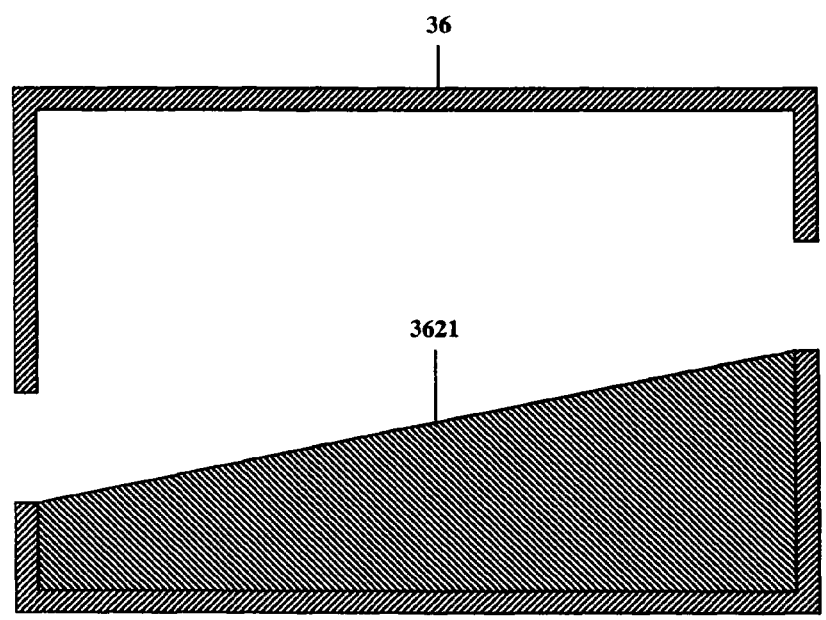
FIG. 10 shows the cross-sectional side-view of bridge 36 that is referred to in FIG. 9.
Figure 11:
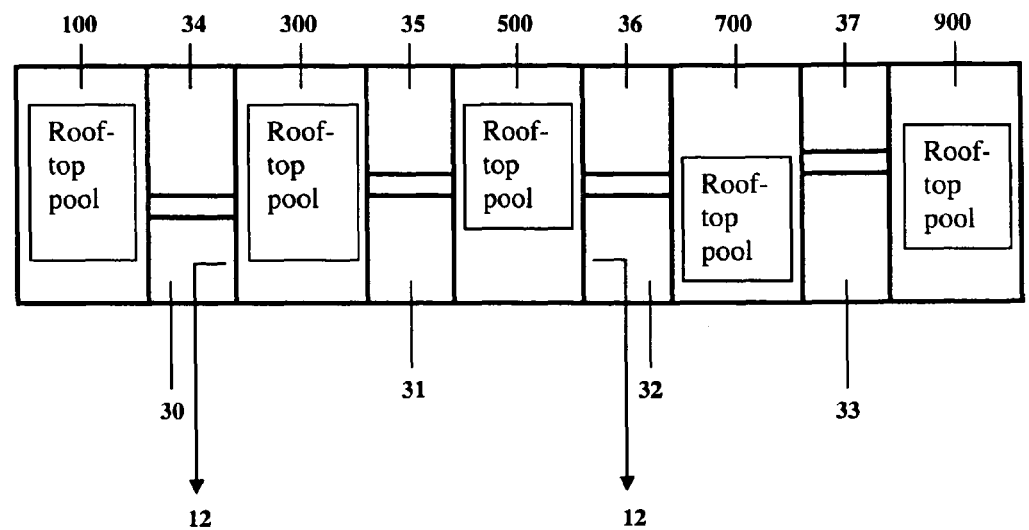
FIG. 11 is a top view of the invention depicted in FIG. 1 with reference arrows to show the orientation of the cross-sectional side-view of an ideal (preferred) integrated road inside of building 300, building 500, and bridge 31, at the point of the through traffic lanes (525) and (325), all of which is depicted in FIG. 12. Rectangles delineating the positions of roof-top pools are now shown to help orient the viewer and correct the simple box and line sketch criticism.

The preferred embodiment of this invention has an integrated road 3621 (see FIG. 10, reference 3621) inside of bridge 36 (36) that is built in a downward sloping manner which is depicted in FIG. 10. FIG. 10 shows a cross-sectional side-view of the preferred embodiment of bridge 36 with a grade that traverses the entire length of the bridge between buildings of the invention.

Figure 12:
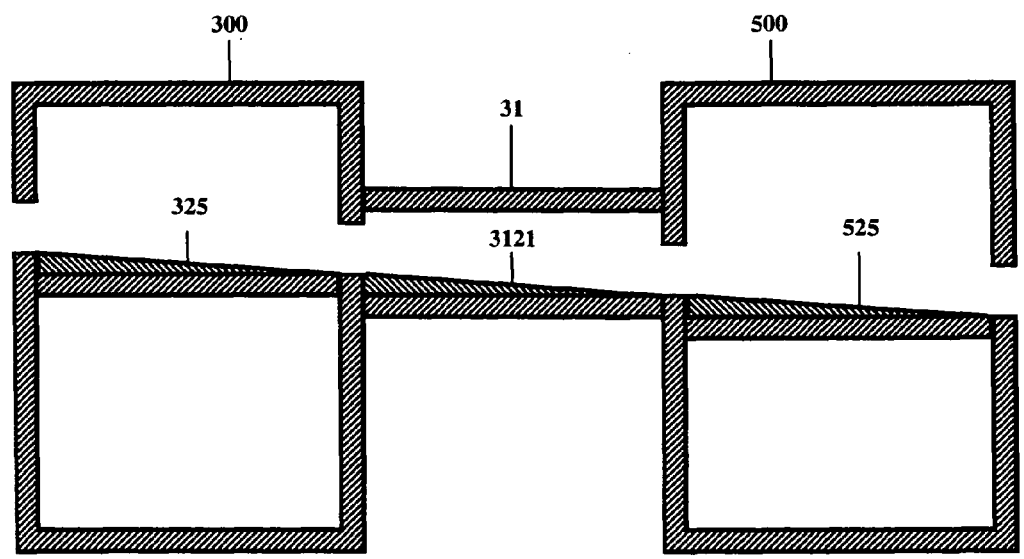
FIG. 12 shows the cross-sectional side-view of building 300, building 500, as well as bridge 31, at the point of the through traffic lanes (525) and (325), that are referred to in FIG. 11.

The first or preferred embodiment of the invention's integrated road inside of building 300, building 500, and bridge 31, at the point of the through traffic lanes 525 (525) and 325 (325), is depicted in FIG. 12. FIG. 12 shows a cross-sectional side-view of the preferred embodiment of the area of the system at the point of the thru traffic lanes 525 (525) and 325 (325) and of bridge 31 (31) and the ramp 3121 (3121) of bridge 31 (31) which has a fairly consistent grade through the buildings and the bridges shown. The through traffic lanes in other parts of this invention will look similar to the through traffic lanes discussed here. Other through traffic lanes (not pictured) are: 317, 717, 725, 3021, 3221, 3321, 3421, 3521, 3621, & 3721. Similarly, all or most of the parts of building 500 can be found in the other buildings. The parts in buildings 100, 300, 700, 900 and the parts in bridges 30, 32, 33, 34, 35, & 37 (all not shown) are listed below under "Equivalent Part#" below:

| Part # | Function | Location | Equivalent Part # | Function | Location |
|---|---|---|---|---|---|
| 514 | on-ramp | 500 | 114 | on-ramp | 100 (building 100) |
| 514 | on-ramp | 500 | 314 | on-ramp | 300 (building 300) |
| 514 | on-ramp | 500 | 714 | on-ramp | 700 (building 700) |
| 514 | on-ramp | 500 | 914 | on-ramp | 900 (upon expansion) |
| 515 | elevator | 500 | 115 | Elevator | 100 (building 100) |
| 515 | elevator | 500 | 315 | Elevator | 300 (building 300) |
| 515 | elevator | 500 | 715 | Elevator | 700 (building 700) |
| 515 | elevator | 500 | 915 | Elevator | 900 (building 900) |
| 516 | dividing wall | 500 | 116 | dividing wall | 100 (upon expansion) |
| 516 | dividing wall | 500 | 316 | dividing wall | 300 (building 300) |
| 516 | dividing wall | 500 | 716 | dividing wall | 700 (building 700) |
| 516 | dividing wall | 500 | 916 | dividing wall | 900 (upon expansion) |
| 517 | thru-traffic lane | 500 | 117 | Thru-traffic lane | 100 (upon expansion) |
| 517 | thru-traffic lane | 500 | 317 | Thru-traffic lane | 300 (building 300) |
| 517 | thru-traffic lane | 500 | 717 | Thru-traffic lane | 700 (building 700) |
| 517 | thru-traffic lane | 500 | 917 | Thru-traffic lane | 900 (upon expansion) |
| 518 | dividing wall | 500 | 118 | dividing wall | 100 (building 100) |
| 518 | dividing wall | 500 | 318 | dividing wall | 300 (building 300) |
| 518 | dividing wall | 500 | 718 | dividing wall | 700 (building 700) |
| 518 | dividing wall | 500 | 918 | dividing wall | 900 (building 900) |
| 519 | Pedestrian lane | 500 | 119 | Pedestrian lane | 100 (building 100) |
| 519 | Pedestrian lane | 500 | 319 | Pedestrian lane | 300 (building 300) |
| 519 | Pedestrian lane | 500 | 719 | Pedestrian lane | 700 (building 700) |
| 519 | Pedestrian lane | 500 | 919 | Pedestrian lane | 900 (building 900) |
| 520 | Ped. elevator | 500 | 120 | Ped. Elevator | 100 (building 100) |
| 520 | Ped. elevator | 500 | 320 | Ped. Elevator | 300 (building 300) |
| 520 | Ped. elevator | 500 | 720 | Ped. Elevator | 700 (building 700) |
| 520 | Ped. elevator | 500 | 920 | Ped. Elevator | 900 (building 900) |
| 3621 | Ramp | Bridge 36 | 3421 | Ramp | 34 (bridge 34) |
| 3621 | Ramp | Bridge 36 | 3521 | Ramp | 35 (bridge 35) |
| 3621 | Ramp | Bridge 36 | 3721 | Ramp | 37 (bridge 37) |
| 3621 | Ramp | Bridge 36 | 3021 | Ramp* | 30 (bridge 30) |
| 3621 | Ramp | Bridge 36 | 3221 | Ramp* | 32 (bridge 32) |
| 3621 | Ramp | Bridge 36 | 3321 | Ramp* | 33 (bridge 33) |
| 522 | Ped. elevator | 500 | 122 | Ped. Elevator | 100 (building 100) |
| 522 | Ped. elevator | 500 | 322 | Ped. Elevator | 300 (building 300) |
| 522 | Ped. elevator | 500 | 722 | Ped. Elevator | 700 (building 700) |
| 522 | Ped. elevator | 500 | 922 | Ped. Elevator | 900 (building 900) |
| 523 | Pedestrian lane | 500 | 123 | Pedestrian lane | 100 (building 100) |
| 523 | Pedestrian lane | 500 | 323 | Pedestrian lane | 300 (building 300) |
| 523 | Pedestrian lane | 500 | 723 | Pedestrian lane | 700 (building 700) |
| 523 | Pedestrian lane | 500 | 923 | Pedestrian lane | 900 (building 900) |
| 524 | dividing wall | 500 | 124 | dividing wall | 100 (building 100) |
| 524 | dividing wall | 500 | 324 | dividing wall | 300 (building 300) |
| 524 | dividing wall | 500 | 724 | dividing wall | 700 (building 700) |
| 524 | dividing wall | 500 | 924 | dividing wall | 900 (building 900) |
| 3618 | Dividing wall | Bridge 36 | 3418 | Dividing wall | 34 (bridge 34) |
| 3618 | Dividing wall | Bridge 36 | 3518 | Dividing wall | 35 (bridge 35) |
| 3618 | Dividing wall | Bridge 36 | 3718 | Dividing wall | 37 (bridge 37) |
| 3618 | Dividing wall | Bridge 36 | 3018 | Dividing wall | 30 (bridge 30) |
| 3618 | Dividing wall | Bridge 36 | 3118 | Dividing wall | 31 (bridge 31) |
| 3618 | Dividing wall | Bridge 36 | 3218 | Dividing wall | 32 (bridge 32) |
| 3618 | Dividing wall | Bridge 36 | 3318 | Dividing wall | 33 (bridge 33) |
| 525 | thru-traffic lane | 500 | 125 | Thru-traffic lane | 100 (upon expansion) |
| 525 | thru-traffic lane | 500 | 325 | Thru-traffic lane | 300 (building 300) |
| 525 | thru-traffic lane | 500 | 725 | Thru-traffic lane | 700 (building 700) |
| 525 | thru-traffic lane | 500 | 925 | Thru-traffic lane | 900 (upon expansion) |
| 526 | dividing wall | 500 | 126 | dividing wall | 100 (upon expansion) |

-continued

| Part # | Function | Location | Equivalent Part # | Function | Location |
|---|---|---|---|---|---|
| 526 | dividing wall | 500 | 326 | dividing wall | 300 (building 300) |
| 526 | dividing wall | 500 | 726 | dividing wall | 700 (building 700) |
| 526 | dividing wall | 500 | 926 | dividing wall | 900 (upon expansion) |
| 527 | elevator | 500 | 127 | Elevator | 100 (building 100) |
| 527 | elevator | 500 | 327 | Elevator | 300 (building 300) |
| 527 | elevator | 500 | 727 | Elevator | 700 (building 700) |
| 527 | elevator | 500 | 927 | Elevator | 900 (building 900) |
| 528 | off-ramp | 500 | 128 | off-ramp | 100 (building 100) |
| 528 | off-ramp | 500 | 328 | off-ramp | 300 (building 300) |
| 528 | off-ramp | 500 | 728 | off-ramp | 700 (building 700) |
| 528 | off-ramp | 500 | 928 | off-ramp | 900 (upon expansion) |
| 530 | on-ramp | 500 | 130 | on-ramp | 100 (upon expansion) |
| 530 | on-ramp | 500 | 330 | on-ramp | 300 (building 300) |
| 530 | on-ramp | 500 | 730 | on-ramp | 700 (building 700) |
| 530 | on-ramp | 500 | 930 | on-ramp | 900 (building 900) |
| 532 | off-ramp | 500 | 132 | off-ramp | 100 (upon expansion) |
| 532 | off-ramp | 500 | 332 | off-ramp | 300 (building 300) |
| 532 | off-ramp | 500 | 732 | off-ramp | 700 (building 700) |
| 532 | off-ramp | 500 | 932 | off-ramp | 900 (building 900) |
| 541 | Loading area | 500 | 141 | Loading area | 100 (building 100) |
| 541 | Loading area | 500 | 341 | Loading area | 300 (building 300) |
| 541 | Loading area | 500 | 741 | Loading area | 700 (building 700) |
| 541 | Loading area | 500 | 941 | Loading area | 900 (building 900) |
| 542 | Loading area | 500 | 142 | Loading area | 100 (building 100) |
| 542 | Loading area | 500 | 342 | Loading area | 300 (building 300) |
| 542 | Loading area | 500 | 742 | Loading area | 700 (building 700) |
| 542 | Loading area | 500 | 942 | Loading area | 900 (building 900) |
| 540 | Dividing wall | 500 | | | |

(*The ramps in bridges 30, 31, 32, & 33 are sloping in the opposite direction of the ramps in bridges 34, 35, 36, & 37.)

The dividing wall 540 (540) divides two-way traffic in building 500. In buildings, 100, 300, 700 & 900 there is two-way traffic but it occurs at different elevations (on two different floors). Therefore, this part, or its equivalent, is not necessary in buildings 100, 300, 700, & 900. If this dividing wall is installed in buildings 100, 300, 700 & 900, and parking is designated on the side of the dividing wall that is opposite of the traffic flow, a doorway type opening is necessary to allow vehicles to enter the parking areas from the loading areas or to allow vehicles into the loading areas from the parking areas.

DESCRIPTIONS OF OTHER EMBODIMENTS OF THE INVENTION

Variations of the preferred embodiment can be constructed such as: Embodiment #2. In Embodiment #2, the bridges in this invention have off-ramps. For example, bridge 36 (36) could have an exit ramp 3635 (3635) (see FIGS. 14 & 16 reference 3635) that leads to the floor above the floor that houses the pathway in building 500 (500). This variation would reduce congestion in the system caused by parking on the same levels or elevations that the traffic flows on.

Figure 13:
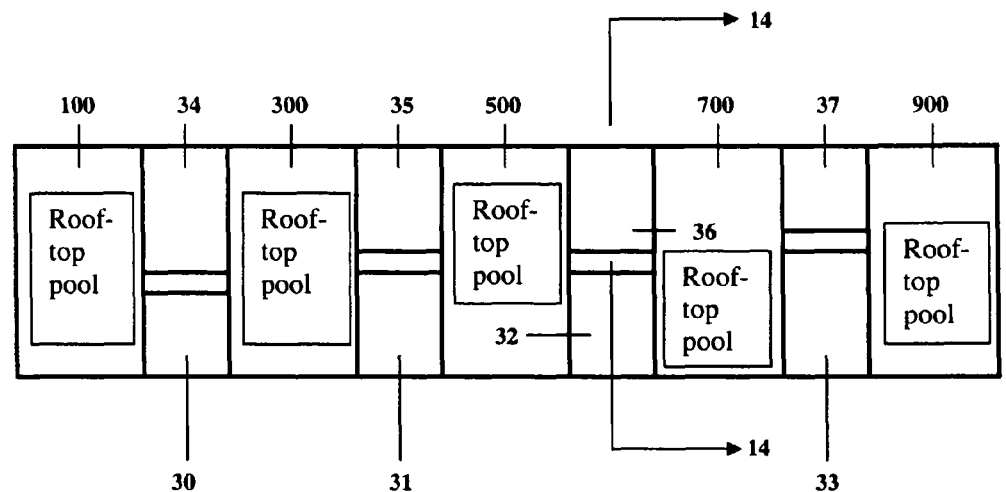
FIG. 13 is a top view of the invention depicted in FIG. 1 with reference arrows to show the orientation of the cross-sectional end-view of the second embodiment the invention's integrated road inside of bridge 36 which is depicted in FIG. 14.
Figure 14:
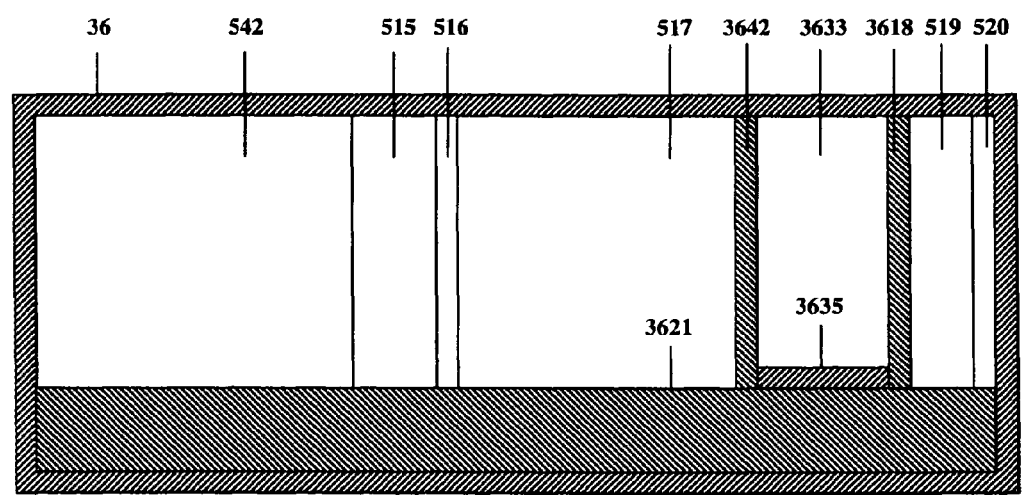
FIG. 14 shows a cross-sectional end-view of the second embodiment of the area in FIG. 13 with an off- ramp 3635 (3635) that leads to a parking area (not shown) above the floor which houses the invention's integrated road.

FIG. 13 is a top view of the invention depicted in FIG. 1 with reference arrows to show the orientation of the cross-sectional end-view of the second embodiment of the invention's integrated road inside of bridge 36 which is depicted in FIG. 14.

FIG. 14 shows a cross-sectional end-view of the second embodiment of the area in FIG. 13 with an off- ramp 3635 (3635) that leads to a parking area above the floor which houses the invention's integrated road and an inside wall 3642 (3642) of the off ramp.

Figure 15:
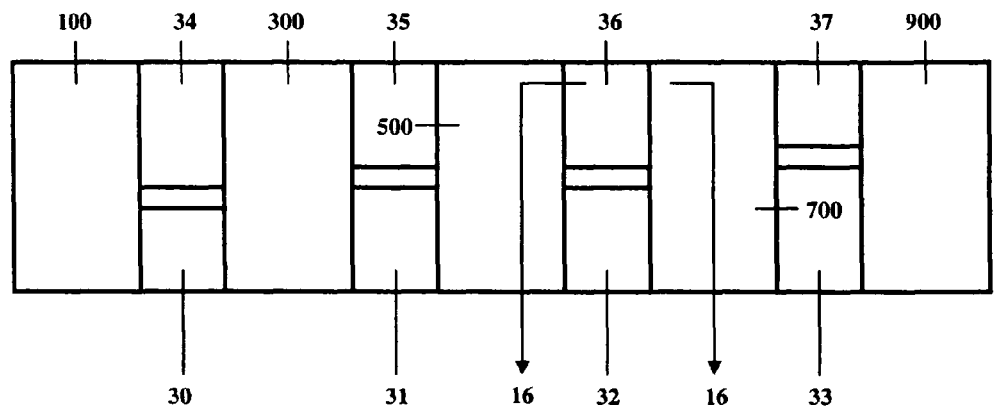
FIG. 15 is a top view of the invention depicted in FIG. 1 with reference arrows to show the orientation of the cross-sectional side-view of the second embodiment of the invention's integrated road inside of bridge 36 which is depicted in FIG. 16.
Figure 16:
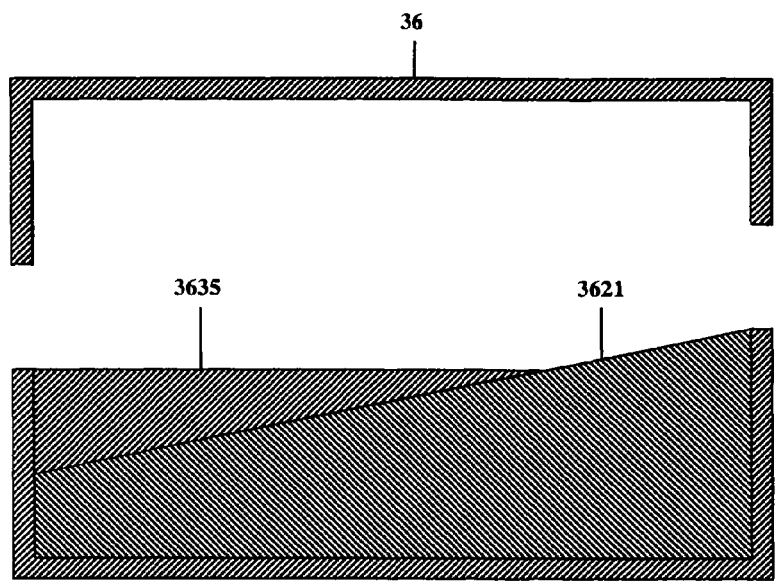
FIG. 16 shows a cross-sectional side-view of the second embodiment of the area in FIG. 15 with an off- ramp 3635 (3635) that leads to a parking area above the floor which houses the invention's integrated road.

FIG. 15 is a top view of the invention depicted in FIG. 1 with reference arrows to show the orientation of the cross-sectional side-view of the second embodiment of the invention's integrated road inside of bridge 36 which is depicted in FIG. 16.

FIG. 16 shows a cross-sectional side-view of the second embodiment of the area in FIG. 15 with an off- ramp 3635 (3635) that leads to a parking area above the floor which houses the invention's integrated road.

Figure 17:
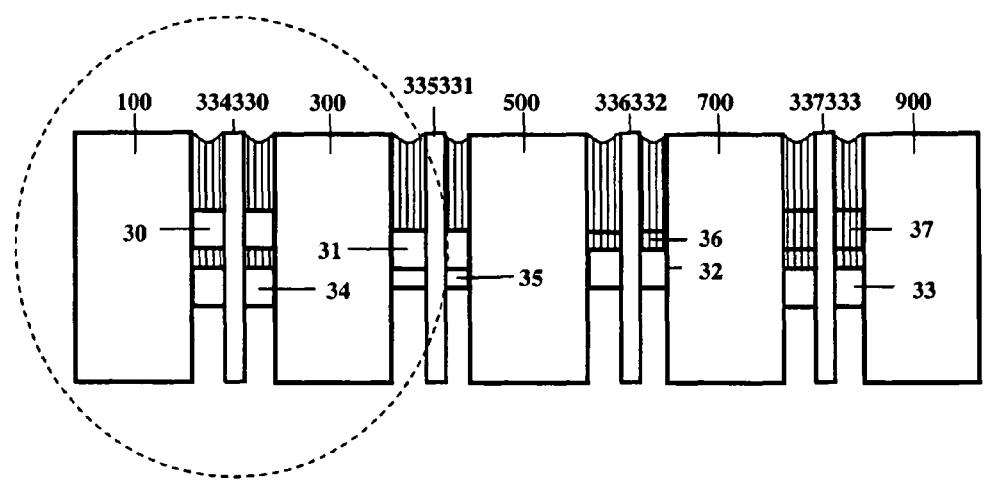
FIG. 17 is a third embodiment of the invention where suspension bridges 334330 (334330), 335331 (335331), 336332 (336332), 337333 (337333) bridge shock absorbers (not shown), interior road suspension bridges (not shown) and bridge-building "connectors" (not shown) are incorporated into the design to suspend the entire road of the invention to combat the problem of "sway" that occurs in some taller buildings in high wind or earthquake conditions. A reference circle is drawn for an enlarged view of one of the suspension bridges depicted in FIG. 18.
Figure 18:
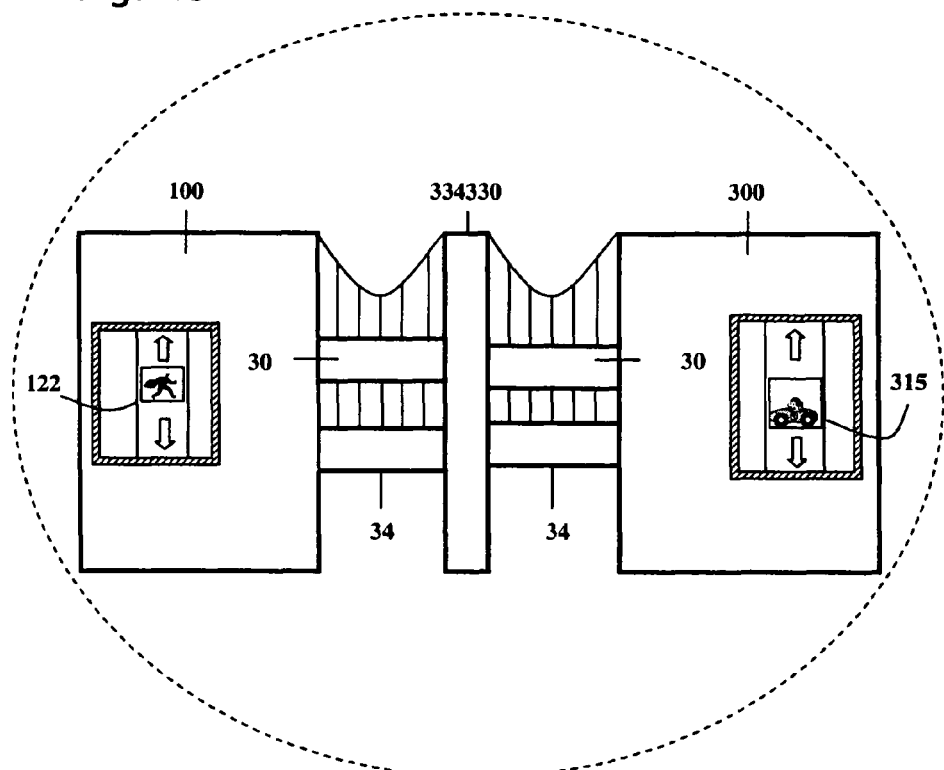
FIG. 18 is a third embodiment of the invention where suspension bridges 334330 (334330), 335331 (335331), 336332 (336332), 337333 (337333), bridge shock absorbers (not shown), interior road suspension bridges (not shown) and bridge-building "connectors" (not shown) are incorporated into the design to suspend the entire road of the system to combat the problem of "sway".

Embodiment #3. In embodiment #3, (see FIGS. 17 & 18), measures are included to combat the problem of sway. Sway is a condition that occurs in high-rises during high winds and earthquakes. FIG. 17 is a third embodiment of the invention where suspension bridges 334330 (334330), 335331 (335331), 336332 (336332), 337333 (337333), bridge shock absorbers (not shown), interior road suspension bridges (not shown) and bridge-building "connectors" (not shown) are incorporated into the design to suspend the entire road of the invention to combat the problem of "sway" that occurs in some taller buildings in high wind or earthquake conditions. A reference circle is drawn for an enlarged view of one of the suspension bridges depicted in FIG. 18. FIG. 18 is a third embodiment of the invention where suspension bridges 334330 (334330), 335331 (335331), 336332 (336332), 337333 (337333), bridge shock absorbers (not shown), interior road suspension bridges (not shown) and bridge-building "connectors" (not shown) are incorporated into the design to suspend the entire road of the invention to combat the problem of "sway". FIG. 18 is referred to in FIG. 17.

Embodiment #4. A fourth embodiment (not shown) of the present invention could be designed with the external bridges suspended (as in embodiment #3) while the roads inside the buildings would not be suspended. A sliding and pivoting trailer hitch type assembly with a floor that can expand, contract and bend may be necessary in this scenario (embodiment #4—not shown) to connect the bridges to the buildings because of the "sway" that occurs in some taller buildings in high wind or earthquake conditions. (Embodiment #4 would look similar to the depiction of embodiment #3 in FIGS. 17 and 18, so it is not shown. The difference between the two embodiments, again, is that the road inside of the buildings in embodiment #4 is fixed, as in embodiment #1, but the road inside of the buildings in embodiment #3 is suspended from the building.)

Figure 19:
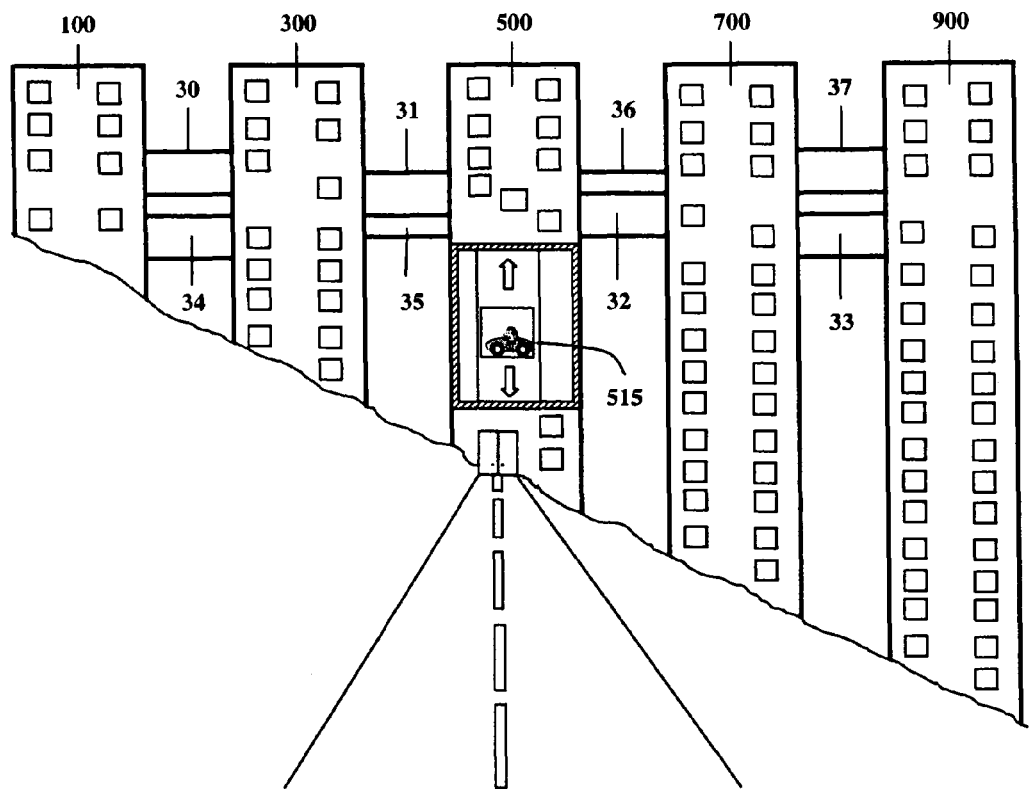
FIG. 19 is a side view of embodiment #6 of the invention that is built on a terrain that is excessively steep. Windows, doors, an inter-connecting roadway, a cross-section of building 500, and stairs have been added to help illustrate the invention and correct the simple box and line sketch criticism. Also, to this afore-mentioned effect, the bridges have been angled.
Figure 20:
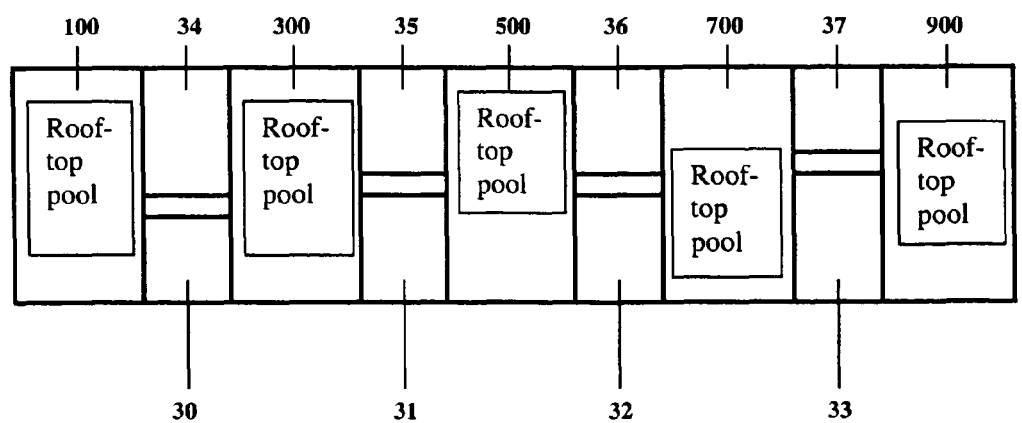
FIG. 20 is a top view of embodiment #6 of the invention depicted in FIG. 19 that is built on a terrain that is excessively steep. Rectangles delineating the positions of roof-top pools are now shown to help orient the viewer and correct the simple box and line sketch criticism.
Figure 21:
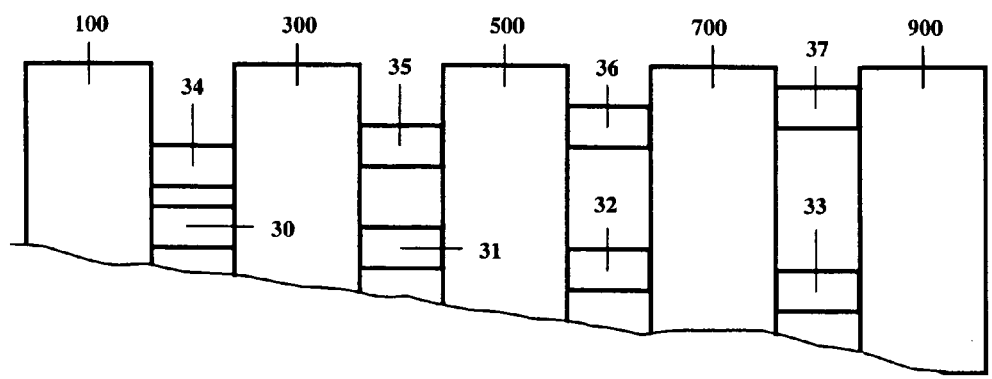
FIG. 21 is a side view of embodiment #12 of the invention where the two integrated roads, of a bi-directional transportation system, do not intersect. Windows, doors and stairs have been added to help illustrate the invention and correct the simple box and line sketch criticism. Also, to this afore-mentioned effect, the bridges have been angled.

Embodiment #5. In embodiment #5 (see FIGS. 19 and 20), this invention allows for safe propulsion assistance over dangerously or excessively steep terrain. There are no new parts or arrangements of parts in this embodiment compared to the preferred embodiment. Only the slope of the natural terrain has changed. FIG. 19 is a side view of embodiment #5 of the invention that is built on a terrain that is excessively steep. FIG. 20 is a top view of embodiment #5 of the invention that is built on a terrain that is excessively steep Embodiment #6. In embodiment #6 (see FIG. 21), this invention does not have traffic flows in both directions at the same level or elevation. This embodiment will increase the amount of space available on the floor that houses the pathway in at least one of the buildings in the system. The extra space might be designated as a parking area or used for a "pit stop" type of establishment. Having the roads built on different levels (Embodiment #6) simplifies the invention and makes abundant parking on each floor with an integrated road possible; However, the tradeoff is that a particular trip may be physically longer or lengthened by the need to wait for an elevator ride down. FIG. 21 is a side view of embodiment #6 of the invention where the two integrated roads, of the bi-directional transportation system, do not intersect at a mutual level. No new parts are necessary to construct this embodiment, however, no building will have two-way traffic so building 500 (500) will now look similar to buildings 300 (300) and 700 (700). Also, a U-turn could conceivably be built at one of the endpoints of the system if the upper and lower levels are close enough to each other in elevation. Although that is not the case in FIG. 21, a depiction of such a U-turn is available in FIG. 27. The U-turn in FIG. 27 will be discussed later in this application.

Figure 22:
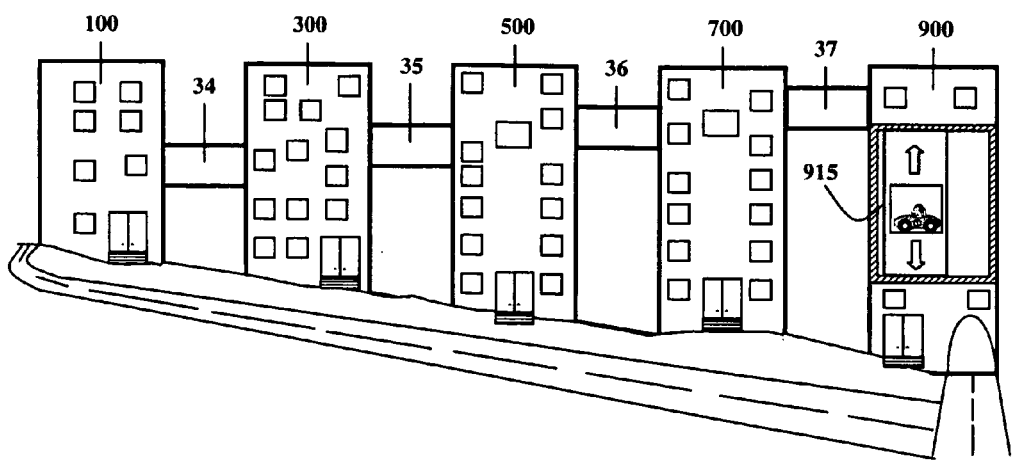
FIG. 22 is a side view of embodiment #11 where an existing roads on the sloped terrain is used in one of the directions of travel. Windows, doors, a cross-sectional view in building 900, an interconnecting roadway, tunnel, and stairs have been added to help illustrate the invention and correct the simple box and line sketch criticism. Also, to this afore-mentioned effect, the bridges have been angled.

Embodiment #7. In embodiment #7 (see FIG. 22), the road of the naturally sloped terrain is used to assist travelers in one direction and only one pathway is constructed to assist travelers going in the opposite (uphill) direction of the naturally sloped terrain. This embodiment costs less to manufacture but may not be utilized as much in in-climate weather. FIG. 22 is a side view of embodiment #7 where existing roads on the terrain (not shown) are used in one of the directions of travel.

Figure 23:
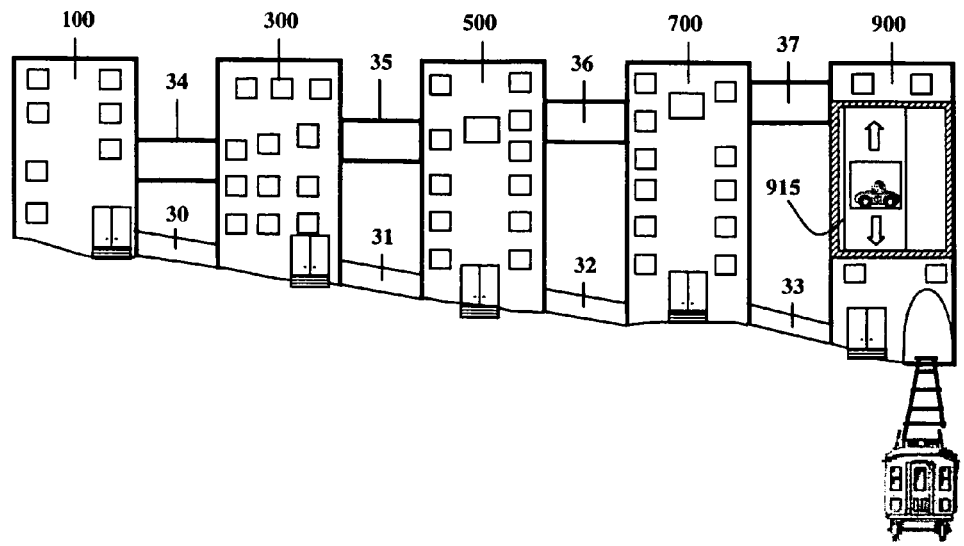
FIG. 23 is a side view of embodiment # 5 where the natural terrain is used as the foundation for the invention's integrated road in one of the directions of travel. Windows, doors, a cross-sectional view in building 900, an interconnecting railway, tunnel, and stairs have been added to help illustrate the invention and correct the simple box and line sketch criticism. Also, to this afore-mentioned effect, the bridges have been angled.

Embodiment #8. In embodiment #8 (see FIG. 23), the natural terrain is used as the foundation for one of the invention's roads in one of the directions of travel. FIG. 23 is a side view of embodiment #8 where the natural terrain is used as the foundation for the invention's road in one of the directions of travel. This embodiment is similar to embodiment #7 but the entire system is enclosed and more suitable during in-climate weather. Potential cross traffic of conventional vehicles would have to circumvent the system in this embodiment. The ramps in bridges 30 (30), 31 (31), 32 (32), & 33 (33) can be eliminated in this embodiment as the natural terrain is providing a grade.

Figure 24:
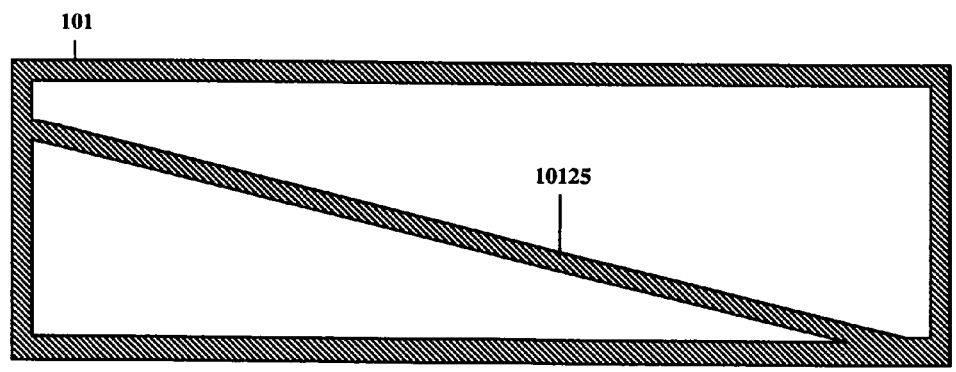
FIG. 24 is a cross-sectional side view taken at the point of lane 10125 of embodiment #10 where there are no bridges between buildings because, in essence, all of the buildings are under one roof so it is really just one big building that houses the entire invention. (This may be necessary if the condition of sway cannot be overcome by other means.)
Figure 25:
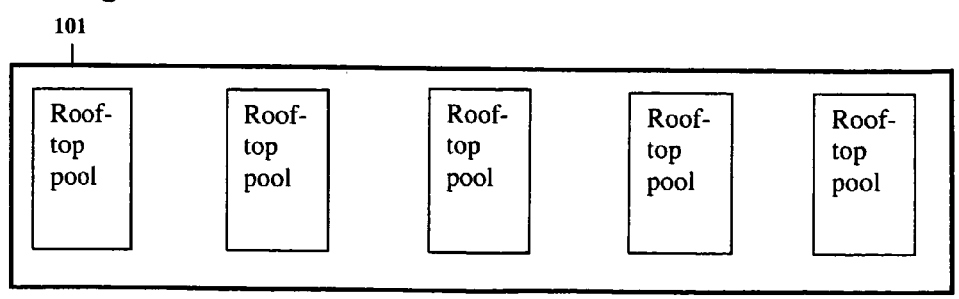
FIG. 25 is a top view of embodiment #10 where there are no bridges between buildings because, in essence, all of the buildings are under one roof so it is really just one big building that houses the entire invention. (This may be necessary if the condition of sway cannot be overcome by other means.) Rectangles delineating the positions of roof-top pools are now shown to help orient the viewer and correct the simple box and line sketch criticism.

Embodiment #9 (see FIG. 24) is an embodiment of this invention where there are no "bridges" between buildings because, in essence, all of the buildings are under one roof so it is really just one big building 101 (101) that houses the entire invention. FIG. 25 is a side view of embodiment #9.

Figure 26:
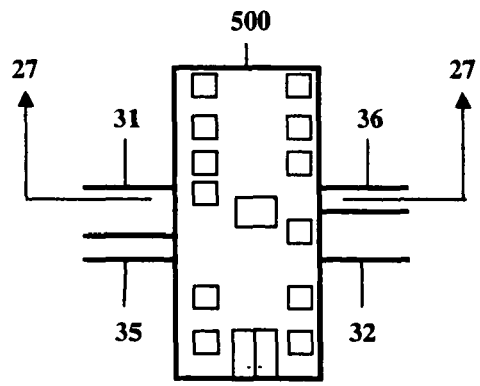
FIG. 26 is a side view of building 500 in FIG. 1 with reference arrows for FIG. 27 which is a cross-sectional top view of building 500 as it appears in embodiment #7. Windows, doors, and stairs have been added to help illustrate the invention and correct the simple box and line sketch criticism. Also, to this afore-mentioned effect, the bridges have been angled.
Figure 27:
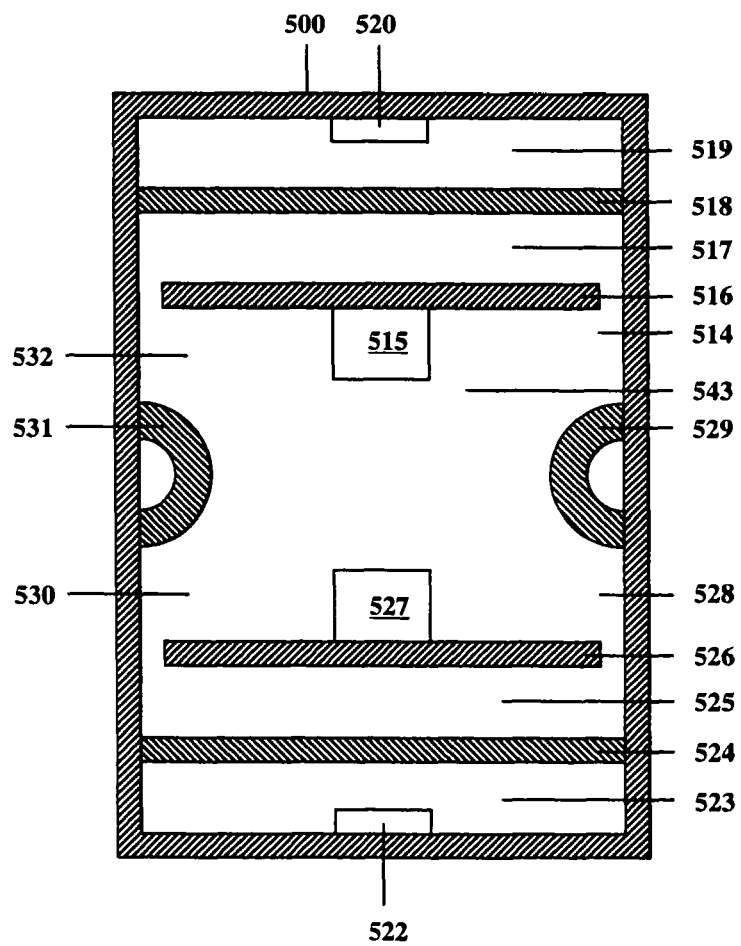
FIG. 27, the top view cross-sectional diagram of building 500 referred to in FIG. 26, is a depiction of embodiment #7 where an interchange is constructed through the middle of building 500.
Figure 28:
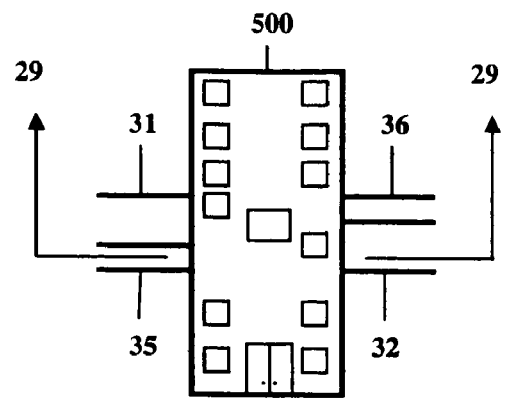
FIG. 28 is a side view of building 500 in FIG. 1 with reference arrows for FIG. 29 which is a cross-sectional top view of building 500 as it appears in embodiment #13. Windows, doors and stairs have been added to help illustrate the invention and correct the simple box and line sketch criticism. Also, to this afore-mentioned effect, the bridges have been angled.

Embodiment #10 (see FIGS. 26 & 27) is constructed the same as the preferred embodiment except for an interchange (see FIG. 27) that is present in building 500 (500). The interchange is possible because traffic is flowing in two directions at approximately the same elevation in the same building 500 (500). FIG. 26 is a side view of building 500 in FIG. 1 with reference arrows for FIG. 27 which is a cross-sectional top view of building 500 in embodiment #10. FIG. 27, the top view cross-sectional diagram of building 500 referred to in FIG. 26, is a depiction of embodiment #10 where an interchange is constructed in the middle of building 500 as opposed to the dividing wall that is present in embodiment #1. Additional parts are required in this embodiment such as:

529—A semicircular wall. (See FIG. 27 reference 529)
531—A semicircular wall opposite of part 529. (See FIG. 27 reference 531)
543—An enlarged loading and unloading area which also provides an area for vehicles to make U-turns. (See FIG. 27 reference 543)

In at least one building in this embodiment, travelers coming from the upper levels (bridges 31 and 36) on the pathway can make a U-turn and continue in a downward manner in the opposite direction to the lower levels (bridges 35 and 32). The U-turn must occur where there is an interchange and traffic flows in both directions at approximately the same elevation.

Embodiment #11. In embodiment #11 (not shown), parking is designated by the loading/unloading areas of buildings—particularly building 500 (500) in FIG. 1. In this embodiment (not shown), building 500 is constructed with a long roadway and elevators are added along the length of the loading/unloading area so that travelers can park in the loading/unloading area and then simply take the nearest elevator to the floor of their choosing.

Embodiment #12. In embodiment #12 (not shown), building 500 of embodiment #1 is constructed in an extra wide manner to allow parking to be designated towards the outside of the building. Although this embodiment would keep the lanes of embodiment #1 intact, pedestrians would encounter cross traffic from the through traffic lane to the parking area. Also, openings in the wall that segregates the pedestrian lane would be necessary so that vehicles could park on the other side of the pedestrian lane. This embodiment is not recommended because the need for traffic controls would increase. Alternatively, building 500 could be built wider than the other buildings in the system and the bridges that are connected to building 500 could be attached towards the outside walls of building 500. Then, a parking area could be designated between the two integrated passageways. The building that would most likely need additional parking above the floor that houses the road is building 500 because it has two pathways at approximately the same elevation while the other buildings do not. Parking on a separate level could be accessed via the transportation elevator if no on-ramp to another floor is constructed. Obviously, parking need not be restricted to any particular floor. It may be more convenient to have some parking areas on every floor depending on how often riders want to get off the system roads and use, perhaps, traditional roads. Also, aside from the through-traffic lanes of the systems integrated roads, nearly any open area inside any of the buildings in the system, or even outside the buildings can be designated for parking.

Figure 29:
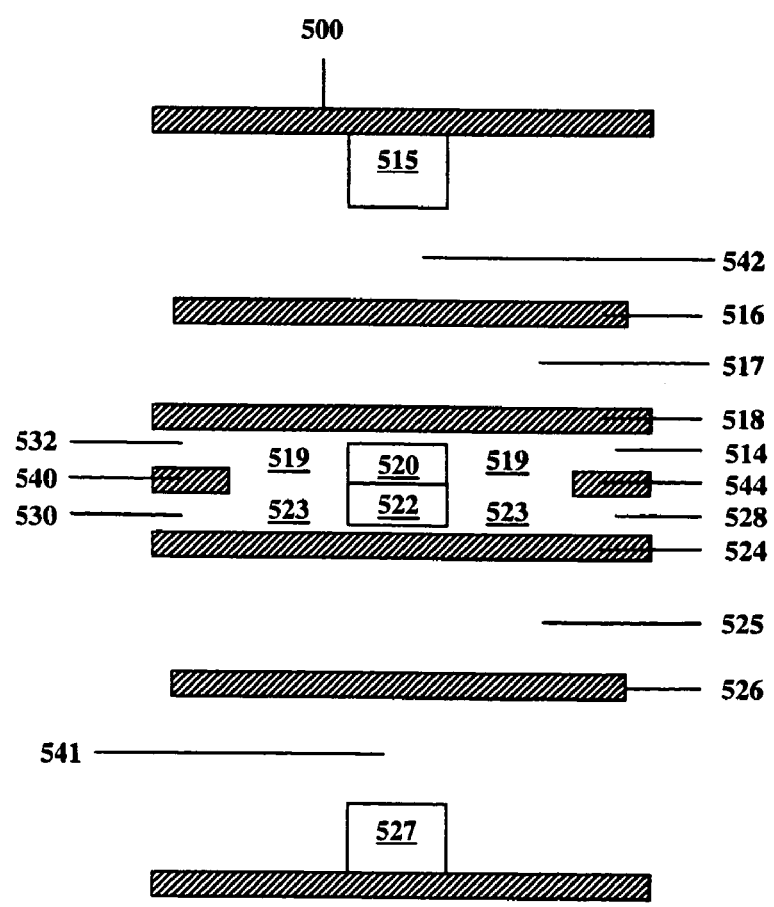
FIG. 29, the top view cross-sectional diagram of building 500 referred to in FIG. 28; is a depiction of embodiment #13 where the traffic lanes are re-arranged to maximize efficiency of the system if no vehicle interchange is constructed through the middle of building 500—as in embodiment #10.

Embodiment #13. In embodiment #13 (see FIG. 29) all of the lanes and elevators in a given direction of travel in embodiment #1 are reversed. That is, for instance, in building 500 (500), the pedestrian lanes 519 (519) & 523 (523) and pedestrian elevators 520 (520) & 522 (522) are located in the center of the building, followed by the through traffic lanes 517 (517) & 525 (525), followed by the loading/unloading areas 541 (541) & 542 (542) and elevators 527 (527) & 515 (515), followed by a parking area (not shown), if space permits, which could also be designated or zoned 'commercial' and used as a "pit stop" type of establishment site. This embodiment is highly recommended due to its efficiency if there is no interchange constructed in the system. The only reason it was not the "preferred embodiment" listed above is because the interchange depicted in FIG. 27 is not compatible with it. That is, the lane positions of the interchange in FIG. 27 are compatible with the lane positions in the preferred embodiment, but the lane positions in FIG. 29 are not compatible with the lane positions in the preferred embodiment.

Embodiment #14 (not shown), has an on-ramp 3536 (3536) (not shown) that connects the upper parking area of building 500 (500) in embodiment #2 to the bridge 35 (35) below the parking area to improve traffic flow and reduce the need for an elevator trip to the pathway from the parking area above it in embodiment #2.

Embodiment #15 (not shown) is identical to embodiment #1 except that numerous beams and supports are present between the buildings to combat sway. This approach to combating sway has the nick-name "The Eiffel Tower Approach" because the areas between the buildings have a seemingly overabundance of supports.

Summary of the Embodiments

Embodiment #1—no interchange is present but lanes are set up for vehicle interchange.

Embodiment #2—off ramp introduced.

Embodiment #3—combat sway by suspending bridge and roads inside buildings as well.

Embodiment #4—combat sway by suspending bridge but not roads inside buildings.

Embodiment #5—utilize over steep terrain.

Embodiment #6—no two way traffic on a single level—maximize same level parking.

Embodiment #7—use naturally sloped terrain w/traditional roadway in one direction.

Embodiment #8—use naturally sloped terrain w/covered roadway in one direction.

Embodiment #9—combat sway using one roof—no "bridges between buildings".

Embodiment #10—vehicle interchange introduced.

Embodiment #11—elongated parking area and extra elevators introduced.

Embodiment #12—parking area outside of pedestrian lane introduced.

Embodiment #13—arrange lanes to maximize efficiency if no vehicle interchange is used Embodiment #14—on ramp from upper level parking area introduced.

Embodiment #15—combat sway using the "Eiffel Tower approach"—support beams.

Summary of the Parts for Embodiments

Embodiment #1—Parts for this embodiment were listed previously. No interchange is present but the lanes are set up to incorporate the vehicle interchange depicted in FIG. 29.

Embodiment #2—off ramp 3635 (3635)—Equivalents 3035-3535 & 3735.

Embodiment #2—off ramp wall 3642 (3642)—Equivalents 3042-3542 & 3742.

Embodiment #3—tower 334330 (334330)—Equivalents 335331, 336332, 337333. (Also, connectors and bumpers required due to sway.)

Embodiment #4—combat sway by suspending bridge but not roads inside buildings. (Trailer hitch type assembly with a contractible and expandable road required.)

Embodiment #5—utilize over steep terrain. (No new parts.)

Embodiment #6—no two way traffic on a single level—maximize same level parking. (Requires the re-arranging of parts at different elevations but no new parts.)

Embodiment #7—use naturally sloped terrain w/traditional roadway in one direction. (Reduces costs by providing only one pathway.)

Embodiment #8—use naturally sloped terrain w/covered roadway in one direction. (Reduces the need for ramps to be constructed in the lower "bridges" which are now located on the ground.)

Embodiment #9—combat sway using one roof/building 101 (101) introduced which has one roof that covers the entire system.

Embodiment #10—vehicle interchange (FIG. 29) introduced. Parts 529, 531, & 543 introduced.

Embodiment #11—elongated parking area and extra elevators (not shown) introduced.

Embodiment #12—parking area outside of pedestrian lane (not shown) introduced. (Doorways required and probably traffic controls too.)

Embodiment #13—lanes arranged (see FIG. 29) to maximize efficiency if no vehicle interchange is used. Wall 540 (540) has to be shortened and wall 544 (544) added to the opposite side of the building, where wall 540 (540) had previously extended to, to make room for the pedestrian elevators. The only off-ramps 514 (514), 528 (528), 530 (530), & 532 (532), shown here are for the pedestrian lanes as this figure also incorporates the aforementioned graded elevator floor concept in the loading/unloading area elevators 515 (515) & 527 (527).

Embodiment #14—on ramp 3536 (3536) (not shown) from upper level parking area introduced.

Embodiment #15—combat sway using the "Eiffel Tower approach"—add exterior bridge and inter-building support beams (not shown).

What is claimed is:

1. A structure comprising:
   a. at least three tall buildings (300, 500, 700);
   b. at least two bridges (35, 36) where one of said bridges (36) connects one of said tall buildings (700) to second said tall building (500) and where a second said bridge (35) connects second said tall building (500) to third said tall building (300), the second bridge being positioned at least slightly lower in elevation than first said bridge (36);
   c. at least one integrated, downwardly graded, pathway extending at least from first said tall building (700) over first said bridge (36) into second said tall building (500) at one point and exiting said second tall building (500) at a second point;
   d. at least one integrated, downwardly graded, pathway extending at least from second said tall building (500) over second said bridge (35) and at least into third said tall building (300) where said pathway over second said bridge (35) is lower in elevation than said pathway over first said bridge (36);
   e. a plurality of means for lifting which connect said integrated, downward graded pathway to selected locations within the buildings said pathway is integrated inside of, whereby pedestrians, rider propelled and zero-emission vehicles traveling along the integrated, downward graded, pathway in the downward direction are at least assisted in propulsion by gravity.

2. The structure of claim 1 further comprising: at least one segregated lane extending for at least a portion of at least one of said pathways for pedestrians.

3. The structure of claim 1 further comprising substantially enclosing at least a portion of at least one of said pathways.

4. The structure of claim 1 further comprising at least one of ramp, divider, on-ramp, loading area, parking area, and off-ramp along at least a portion of at least one of said pathways.

5. The structure of claim 1 further comprising at least one of air filtering, air heating, air humidifying, air dehumidifying and air cooling devices to control the air along at least the portion of at least one of said pathways.

6. The structure of claim 1 further comprising at least one temporary wall at at least one end of the at least one of said pathways to allow for easy expansion of the pathway to a selected location.

7. The structure of claim 1 further comprising at least a portion of an interchange in said second building along at least one said pathway that traverses said second building.

8. The structure of claim 1 further comprising at least one parking area in at least one of said serially connected tall buildings.

9. A structure comprising:
   a. at least three tall buildings (300, 500, 700);
   b. at least two bridges (35, 36) where a first of said bridges (36) connects one of said tall buildings (700) to second said tall building (500) and where a second said bridge (35) connects second said tall building (500) to third said tall building (300);
   c. at least one integrated, pathway with an overall downward grade that extends at least from first said tall building (700) over first said bridge (36) into second said tall building (500) at one point which is lower than the highest point of said pathway at first said tall building (700) and exiting said second tall building (500) at a second point which is no higher in elevation than the point connecting second said tall building (500) to first said bridge (36) then continuing along an overall downward grade over second said bridge (35) and at least into third said tall building (300) at a point which is lower than the highest point of the pathway inside second said tall building (500);
   d. a plurality of means for lifting connecting said integrated, pathway with an overall downward grade to a plurality of selected locations at least within at least two said buildings (700,300),
   whereby travelers traveling along the integrated, pathway with an overall downward grade in the downward direction are at least assisted in propulsion by gravity.

10. The structure of claim 9 further comprising: at least one segregated lane extending for at least a portion of said pathway for pedestrians.

11. The structure of claim 9 further comprising substantially enclosing at least a portion of said pathway.

12. The structure of claim 9 further comprising at least one of ramp, divider, on-ramp, loading area, parking area, interchange, and off-ramp along at least a portion of said pathway.

13. The structure of claim 9 further comprising at least one of air filtering, air heating, air humidifying, air dehumidifying, air circulating, air re-circulating and air cooling devices to control the air along at least the portion of said pathway.

14. The structure of claim 9 further comprising at least one temporary wall at at least one end of the said pathway to allow for easy expansion of the pathway to a selected location.

15. The structure of claim 9 further comprising at least one off-pathway parking area in at least one of said serially connected tall buildings.

16. The structure of claim 9 wherein the overall downward grade of said integrated downward graded pathway is at least 1%.

* * * * *